Figure 1:
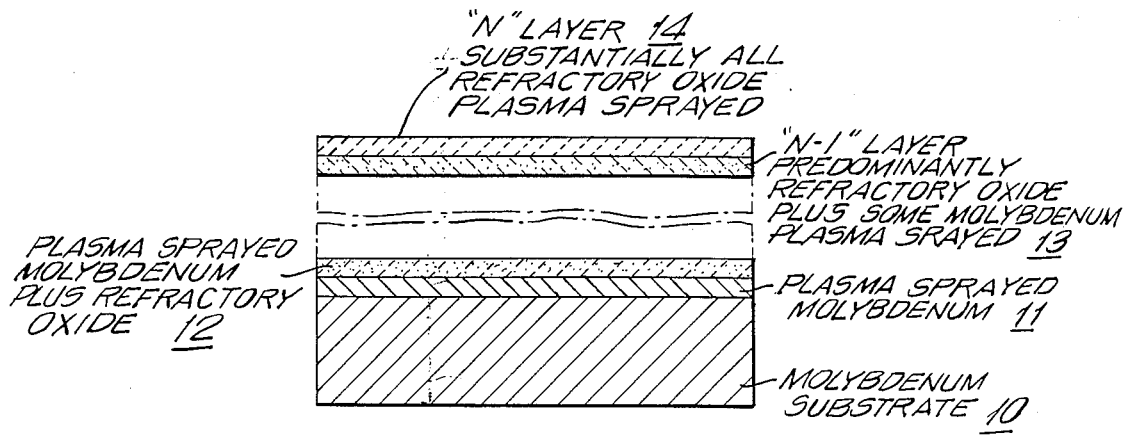

United States Patent [19]

Timmons

[11] Patent Number: 4,745,033
[45] Date of Patent: May 17, 1988

[54] OXIDATION RESISTANT COATINGS FOR MOLYBDENUM

[75] Inventor: George A. Timmons, Ann Arbor, Mich.

[73] Assignee: AMAX Inc., Greenwich, Conn.

[21] Appl. No.: 29,691

[22] Filed: Mar. 24, 1987

[51] Int. Cl.$^4$ .............................. B22F 5/04; B22F 7/02
[52] U.S. Cl. ..................................... 428/552; 428/547; 428/557; 428/564; 428/632; 428/640; 416/241 R
[58] Field of Search ............... 428/547, 552, 557, 564, 428/632, 640, 663; 416/241 R

[56] References Cited

U.S. PATENT DOCUMENTS

| | | | |
|---|---|---|---|
| 3,261,673 | 7/1966 | Wheildon, Jr. | 428/552 |
| 3,340,026 | 9/1967 | Kiwak | 428/640 |
| 3,719,519 | 3/1973 | Perugini | 428/564 |
| 3,837,817 | 9/1974 | Nakamura | 428/564 |
| 3,999,954 | 12/1976 | Kolaska et al. | 428/547 |
| 4,485,150 | 11/1984 | Tsuno | 428/632 |
| 4,612,256 | 9/1986 | Neuhauser et al. | 428/547 |

Primary Examiner—John F. Terapane
Assistant Examiner—Eric Jorgensen
Attorney, Agent, or Firm—Michael A. Ciomek; Eugene J. Kalil

[57] ABSTRACT

A molybdenum article is disclosed in which the substrate thereof has adherently bonded thereto a thermally self-healing plasma-sprayed coating consisting essentially of a composite of molybdenum and a refractory oxide material capable of reacting with molybdenum oxide under oxidizing conditions to form a substantially thermally stable refractory compound of molybdenum. The plasma-sprayed coating is formed of a plurality of interbonded plasma-sprayed layers of a composite of molybdenum/refractory oxide material produced from a particulate mixture thereof. The coating comprises a first layer of molybdenum plasma-sprayed bonded to the substrate of said molybdenum element and a second layer of plasma-sprayed mixture of particulate molybdenum/refractory oxide consisting essentially of predominantly molybdenum bonded to the first layer. The succeeding layers of the molybdenum/refractory oxide mixture provide from layer to layer a descending concentration gradient of molybdenum and a corresponding ascending concentration gradient of refractory oxide material. The concentration gradient continues to an N-1 layer in which the refractory oxide concentration of the mixture predominates and terminates at the Nth layer, the Nth layer consisting essentially of the refractory oxide material plasma-sprayed bonded to the N-1 layer.

7 Claims, 1 Drawing Sheet

OXIDATION RESISTANT COATINGS FOR MOLYBDENUM

This invention relates to protectively coated molybdenum elements or articles for use at elevated temperatures in oxidizing and/or corrosive environments. Examples of such articles include molybdenum electrodes for use in molten glass environments, nozzles, nozzle vanes and other structural components employed in jet engines, among other molybdenum components.

STATE OF THE ART

As a refractory metal, molybdenum is very attractive for use at elevated temperatures. It has a high melting point of about 2610° C. and a density of about 10.28 grs/c.c.

Molybdenum exhibits high resistance to creep and deformation at relatively high temperatures. In addition, molybdenum maintains a relatively high strength at elevated temperatures.

A drawback in the use of molybdenum at elevated temperatures in oxidizing environments is its increasingly susceptibility to oxidation at temperatures above 1100° F. (595° C.) due to the formation of molybdenum trioxide which becomes highly volatile at temperatures above 1650° F. (900° C.). Because of this, when the metal is exposed to high temperatures, a rapid oxidation takes place and the metal is substantially destroyed by continual oxygen attack and volatization of molybdenum trioxide. The attack progresses from the surface of the molybdenum substrate to the core of the exposed article.

With reference to the disclosure of U.S. Pat. No. 2,683,305, attempts have been made to protect molybdenum surfaces by conventional means, such as by enveloping the metal in a stable ceramic, for example, alumina or silimanite, in the form of shells or tubes. Another method attempted has been to spray the ceramic material in the form of a slurry and subsequently baking the coating to the substrate. Metal coatings have been tried, either by electrolysis or vapor deposition, among other methods. Despite these attempts, the coatings or casings did not achieve lasting results. The coatings tended to be porous and to spall during thermal cycling, thereby exposing the molybdenum substrate to catastrophic oxidation.

Molybdenum, has a high coefficient of diffusion at elevated temperatures. It can diffuse into an alloy coating at a rapid rate with increase in temperature. Stable compounds, such as the refractory oxides $Al_2O_3$, $SiO_2$ or $MgO$ when brought into contact with molybdenum oxide at high temperatures react to form molybdate compounds.

It would be desirable to provide a protective, strongly adhering coating which not only resists the inward diffusion of oxygen from the environment, but which in turn resists the outward diffusion of molybdenum trioxide into or through the coating. The coating should be one that resists spalling during thermal cycling and which in use is self-healing.

OBJECTS OF THE INVENTION

One object of the invention is to provide a coated molybdenum article which will resist oxidation and corrosion at elevated temperatures.

Another object is to provide a coated molybdenum article in which the coating is formed of a plurality of layers and which is self-healing at elevated temperatures under oxidizing conditions.

These and other objects will more clearly appear when taken in conjunction with the following disclosure, the appended claims and the accompanying drawing.

THE DRAWING

Figure 2:
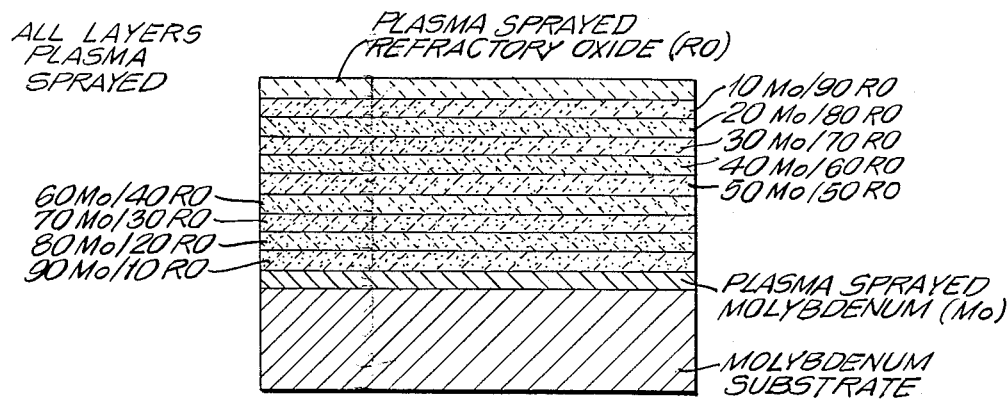

FIG. 1 is a cross-section of a coated molybdenum substrate which has been exaggerated for clarity to show schematically the layers making up the coating; and FIG. 2 is similar to FIG. 1 except that it is a specific embodiment in which the coating is made up of eleven layers produced by plasma spraying to provide a composition gradient based on a mixture of particulate molybdenum and refractory oxide, the molybdenum content decreasing from layer to layer while the refractory oxide content increases.

SUMMARY OF THE INVENTION

Stating it broadly, the invention is directed to an article of manufacture in the form of a molybdenum element in which the substrate thereof has adherently bonded thereto a thermally self-healing plasma-sprayed coating consisting essentially of a composite of molybdenum and a refractory oxide material capable of reacting with molybdenum oxide under oxidizing conditions to form a substantially thermally stable refractory compound of molybdenum. The plasma-sprayed coating is formed of a plurality of interbonded plasma-sprayed layers of a composite of molybdenum/refractory oxide material produced from a particulate mixture thereof, the plurality of bonded layers ranging from a first layer adjacent to molybdenum substrate to an Nth or last layer. The first layer is formed of molybdenum which is plasma-sprayed bonded to the substrate of molybdenum element.

The second layer comprises a plasma-sprayed mixture of particulate molybdenum/refractory oxide consisting essentially of predominantly molybdenum bonded to the first layer, with the succeeding layers of the molybdenum/refractory oxide mixture providing from layer to layer a descending concentration gradient for molybdenum and a corresponding ascending concentration gradient for the refractory oxide material, the concentration gradient continuing to an N-1 layer in which the refractory oxide concentration of the mixture predominates and terminates at the Nth layer. The Nth layer consists essentially of refractory oxide material plasma-sprayed bonded to the N-1 layer.

The refractory oxide is preferably selected from the group consisting of zirconium oxide, hafnium oxide and aluminum oxide, aluminum oxide being preferred. Any refractory oxide can be used so long as it is capable of reacting with molybdenum powder under oxidizing conditions to produce stable, complex, molybdenum oxide compounds having melting points in excess of about 950° C.

The layers between the first and last layers making up the coating are produced by plasma spraying a mixture of molybdenum and refractory oxide powders, with the molybdenum content of the mixture descending in concentration from layer to layer as the refractory oxide content ascends in concentration, thereby providing a concentration gradient having improved resistance to spalling as well as improved resistance to oxidation and corrosion. The particle size of the mixtures employed generally ranges from about 20 microns to about 200 microns.

The preferred coating is one in which the descending concentration for molybdenum from layer to layer proceeds step-wise at approximately 10% increments by weight, while the corresponding ascending concentration for the refractory oxide from layer to layer proceeds step-wise approximately 10% increments by weight, with the last layer being substantially all refractory oxide.

DETAILS OF THE INVENTION

The layers forming the total coating are applied using plasma spraying. Plasma spraying is a particular method of spraying whereby a gas, e.g., argon, nitrogen, and hydrogen, is caused by virtue of its passage through an electric arc to be put into highly excited state. The state corresponds to a higher energy state than the gaseous state and provides temperatures substantially in excess of 5000° C., for example in excess of 10,000° C. and up to about 15,000° C. and higher.

A powder-type plasma spray gun is used in producing the coatings. An example of such a gun is the 3MB plasma gun which is marketed by Metco, Inc. of Westbury, Long Island. This gun uses a GE nozzle through which the powder to be sprayed is fed using argon as a primary gas at elevated pressure. The powder passes through the plasma arc and is melted prior to reaching the substrate.

As pointed out in U.S. Pat. No. 3,958,097, during plasma spraying, an arc is established between two oppositely polarized electrodes employing a current generally in the range of 155 to 1000 amps. The powder to be sprayed is forced through a constricting orifice and accelerated at sonic velocities with intense heat.

Because of the ease with which molybdenum powder oxidizes, an annular gas stream is used as a shield, i.e., argon, surrounding the heated powder exiting from the nozzle, thereby assuring protection for the molybdenum powder mixed with the refractory. An advantage of using plasma spraying is that a uniform deposit is obtained accompanied by strong adherent bonding to the substrate, as well as bonding between the subsequently deposited layers.

A schematic cross-section is shown in FIG. 1 broken away showing a typical coating starting with a first layer of plasma-sprayed molybdenum followed by succeeding layers of molybdenum and refractory oxide mixture.

FIG. 1 shows a molybdenum substrate 10 upon which a molybdenum layer 11 has been plasma-sprayed followed by a next layer 12 of a plasma-sprayed molybdenum/refractory oxide mixture in which molybdenum predominates, and so on to the "N-1" layer 13 in which the refractory oxide predominates, the last plasma sprayed layer "N" (14) being substantially all refractory oxide.

The plurality of layers provide a composition gradient which aids in inhibiting spalling by averaging out the expansion coefficient differences from layer to layer and thus avoid sudden changes in thermal expansion across the coating during thermal cycling. Each layer has a dispersion of molybdenum particles which serve to capture oxygen diffusing inward from the environment at elevated temperatures and thereby resist the further penetration of oxygen to the molybdenum substrate being protected. As the molybdenum particles react with the oxygen, the oxidized molybdenum reacts with adjacent particles of refractory oxide to form complex stable compounds of molybdenum oxide.

Thus, the coating is self-healing and provides protection to the molybdenum substrate. This can be important in instances where micro fissures, if any, form during thermal cycling.

FIG. 2 is illustrative of a specific embodiment of the invention wherein the descending concentration gradient for molybdenum proceeds at step-wise increments of approximately 10% by weight from layer to layer, while the corresponding ascending concentration gradient for the refractory oxide proceeds at step-wise increments of approximately 10% by weight.

As illustrative of the invention, the following examples are given:

EXAMPLE 1

A protective coating is produced on a molybdenum substrate by employing alumina as the refractory material. A plurality of powder charges are employed to provide the desired concentration gradients in the ultimate coating. In this example, the powder charges vary from each other at composition increments of approximately 20% by weight as follows:

First Layer—Molybdenum powder of average particle size of about 20 to 200 microns.

Second Layer—80% Mo/20% Al$_2$O$_3$ of average particle size of about 20 to 200 microns.

Third Layer—60% MO/40% Al$_2$O$_3$ of average particle size of about 20 to 200 microns.

Fourth Layer—40% Mo/60% Al$_2$O$_3$ of average particle size of about 20 to 200 microns.

Fifth Layer—20% MO/80% Al$_2$O$_3$ of average particle size of about 20 to 200 microns.

Sixth Layer—100% Al$_2$O$_3$ of average particle size of about 20 to 200 microns.

The molybdenum substrate is cleaned prior to plasma spraying in the conventional manner.

Thereafter, each of the layers is deposited by plasma spraying in the known manner to provide a coating formed of a plurality of layers in which the concentration gradient from the first layer to the last layer proceeds at descending increments for molybdenum of approximately 20% by weight and corresponding ascending increments for alumina of approximately 20% by weight.

EXAMPLE 2

The method of Example 2 is repeated except that the descending and ascending increments of concentration of molybdenum and alumina proceed at approximately 10% by weight.

EXAMPLE 3

A protective coating is produced on a molybdenum substrate by employing zirconia as the refractory material using the process described in Example 1. The powder charges employed for each layer vary from each other at composition increments of approximately 10% by weight as in Example 2, the first layer deposited being substantially all molybdenum, the last layer deposited being substantially all zirconia.

Following completion of the coating process, it may be desirable to stabilize the coating before use by heating the coated molybdenum article to an elevated temperature in excess of about 800° C. and ranging up to about 1100° C. in an oxidizing atmosphere in order to remove any porosity resulting from the plasma spray process. By allowing the oxygen from the atmosphere to penetrate the coating and react with the dispersed molybdenum particles, the coating self-heals and the porosity of the coating is substantially eliminated. The heating may be conducted at temperature for at least about 2 hrs and range up to about 10 hrs. When the coated component is to be used at elevated temperatures in excess of 800° C. in oxidizing atmpopheres, the coating may be stabilized during the initial stages of use.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. As an article of manufacture, a molybdenum element comprising a molybdenum substrate in which said substrate has adherently bonded thereto a thermally self-healing plasma-sprayed coating consisting essentially of a composite of molybdenum and a refractory oxide material capable of reacting with molybdenum oxide under oxidizing conditions to form a substantially thermally stable refractory compound of molybdenum,
   said plasma-sprayed coating being formed of a plurality of interbonded plasma-sprayed layers of a composite of molybdenum/refractory oxide material produced from a particulate mixture thereof,
   said plurality of bonded layers ranging from a first layer adjacent to said substrate to an Nth or last layer which include:
   (a) a first layer of molybdenum plasma-sprayed bonded to the said molybdenum substrate of said molybdenum element,
   (b) a second layer of plasma-sprayed mixture of particulate molybdenum/refractory oxide consisting essentially of predominantly molydbenum bonded to said first layer,
   (c) with succeeding layers of said molybdenum/refractory oxide mixture providing from layer to layer a descending concentration gradient of molydbenum and a corresponding ascending concentration gradient of refractory oxide material,
   said concentration gradient continuing to an N-1 layer in which the refractory oxide concentration of the mixture predominates and terminates at the Nth layer,
   (d) said Nth layer consisting essentially of said refractory oxide material plasma-sprayed bonded to said N-1 layer.

2. The article of manufacture of claim 1, wherein said refractory oxide material is selected from the group consisting of zirconium oxide, hafnium oxide and aluminum oxide.

3. The article of manufacture of claim 2, wherein said refractory oxide is aluminum oxide.

4. As an article of manufacture, a molybdenum element comprising a molybdenum substrate in which said substrate has adherently bonded thereto a thermally self-healing plasma-sprayed coating consisting essentially of a composite of molybdenum and a refractory oxide material selected from the group consisting of zirconium oxide, hafnium and aluminum oxide, which refractory oxide material is capable reacting with molybdenum oxide under oxidizing conditions to form a substantially thermally stable refractory compound of molybdenum,
   said plasma-sprayed coating being formed of a plurality of interbonded plasma-sprayed layers of a composite of molybdenum/and said refractory oxide material produced from a particulate mixture thereof,
   said plurality of bonded layers ranging from a first layer adjacent to said substrate to an Nth of last layer which include:
   (a) a first layer of molybdenum plasma-sprayed bonded to the said molybdenum substrate of said molybdenum element,
   (b) a second layer of a plasma-sprayed mixture of said particulate molybdenum/refractory oxide consisting essentially of predominantly molybdenum bonded to said first layer,
   (c) with succeeding layers of said molybdenum/refractory oxide mixture providing from layer to layer a descending concentration gradient of molybdenum and a corresponding ascending concentration gradient of refractory oxide material,
   said concentration gradient continuing to an N-1 layer in which the refractory oxide concentration of the mixture predominates and terminates at the Nth layer,
   (d) said Nth layer consisting essentially of said refractory oxide material plasma-sprayed bonded to said N-1 layer.

5. The article of manufacture of claim 4, wherein said succeeding layers of said plasma-sprayed molybdenum/refractory oxide mixture starting from said first layer of plasma-sprayed molybdenum provides a layer to layer descending concentration gradient of molybdenum at increments of approximately 10% by weight and layer to layer ascending concentration gradient of the refractory oxide at increments approximately 10% by weight.

6. The article of manufacture of claim 5, wherein said refractory oxide is aluminum oxide.

7. As an article of manufacture, a molybdenum element comprising a molybdenum substrate in which said substrate thereof has adherently bonded thereto a thermally self-healing plasma-sprayed coating consisting essentially of a composite of molybdenum and aluminum oxide which reacts with molybdenum oxide under oxidizing conditions to form a substantially thermally stable refractory compound of molybdenum,
   said plasma-sprayed coating being formed of a plurality of interbonded plasma-sprayed layers of a composite of molybdenum/aluminum oxide material produced from a particulate mixture thereof,
   said plurality of bonded layers ranging from a first layer adjacent to said substrate to an Nth or last layer which include:
   (a) a first layer of molybdenum plasma-sprayed bonded to the said molybdenum substrate of said molybdenum element,
   (b) a second layer of plasma-sprayed mixture of particulate molybdenum/aluminum oxide consisting essentially of predominantly molybdenum bonded to said first layer,
   (c) with succeeding layers of said molybdenum-/aluminum oxide mixture providing from layer to layer a descending concentration gradient of molybdenum at approximately 10% increments and a corresponding ascending concentration gradient of refractory oxide material at approximately 10% increments,
said concentration gradient continuing to an N-1 layer in which the aluminum oxide concentration of the mixture is approximately 90% and terminates at the Nth layer,
(d) said Nth layer containing approximately 100% of said aluminum oxide material plasma-sprayed bonded to said N-1 layer.

* * * * *